United States Patent [19]

Teng et al.

[11] Patent Number: 5,222,197
[45] Date of Patent: Jun. 22, 1993

[54] RULE INVOCATION MECHANISM FOR INDUCTIVE LEARNING ENGINE

[75] Inventors: Henry S. Teng, Groton; Kaihu Chen, Shirley, both of Mass.; Matthew Wilson, Westville, Ill.; Michael P. Verdeven, Westboro; Gregory B. Abbruzzese, Maynard, both of Mass.

[73] Assignee: Digital Equipment Corporation, Maynard, Mass.

[21] Appl. No.: 545,072

[22] Filed: Jun. 28, 1990

[51] Int. Cl.$^5$ .............................................. G06F 15/18
[52] U.S. Cl. ...................................... 395/68; 395/51; 395/77
[58] Field of Search .................... 364/513; 395/51, 61, 395/68

[56] References Cited

U.S. PATENT DOCUMENTS

| | | | |
|---|---|---|---|
| 4,642,782 | 2/1987 | Kemper et al. | 364/550 |
| 4,752,890 | 5/1988 | Natarajan et al. | 364/513 |
| 4,777,585 | 10/1988 | Kokawa et al. | 364/164 |
| 4,802,103 | 1/1989 | Faggin et al. | 364/513 |
| 4,803,642 | 2/1989 | Muranga | 364/513 |
| 4,809,219 | 2/1989 | Ashford et al. | 364/900 |
| 4,829,450 | 5/1989 | Manthey | 364/513 |
| 4,843,567 | 6/1989 | Mukherjee et al. | 364/513 |
| 4,849,879 | 7/1989 | Chinnaswamy et al. | 364/200 |
| 4,860,213 | 8/1989 | Bonissone | 364/513 |
| 4,866,635 | 9/1989 | Kahn et al. | 364/513 |
| 4,881,178 | 11/1989 | Holland et al. | 364/513 |
| 4,890,240 | 12/1989 | Loeb et al. | 364/513 |
| 4,959,799 | 9/1990 | Yoshiura et al. | 364/513 |
| 4,999,833 | 3/1991 | Lee | 370/94.1 |
| 5,016,204 | 5/1991 | Simoudis et al. | 364/578 |
| 5,022,498 | 6/1991 | Sasaki et al. | 187/127 |
| 5,034,898 | 7/1991 | Lu et al. | 364/513 |
| 5,099,436 | 3/1992 | McCown et al. | 364/550 |
| 5,103,498 | 4/1992 | Lanier et al. | 395/68 |

FOREIGN PATENT DOCUMENTS 1222305  9/1988  Japan .

OTHER PUBLICATIONS

Ng et al., "Uncertainty Management in Expert Systems", IEEE Expert, Apr. 1990, pp. 29–48.
Lindley, "The Probability Approach to the Treatment of Uncertainty in Artificial Intelligence and Expert Systems", *Statistical Science* vol. 2 No. 1 pp. 3–44, 1987.
Cheeseman, "Learning of Expert Systems From Data".
Sorrells, "A Time-Constrained Inference Strategy For Real Time Expert Systems", *Proc. IEEE 1985 National Aerospace and Electronics Conference* pp. 1336–1341.
Chen, "An Inductive Engine for the Acquisition of Temporal Knowledge" Doctoral Thesis, Dep't of Computer Science, Univ. of Ill. (1988).
Lu, "An Intelligent Framework for Engineering Decision-making," SAE Technical paper No. 870562, Feb. 1987.
Lu et al., "A Machine Learning Approach to the Automatic Synthesis etc." AI EDAM, vol. No. 1, No. 2, pp. 109–118 (1987).
Vaccarro, "Detection of Anomalous Computer Session Activity," Proceeding of IEEE Symposium on Security and Privacy, May 1989.

*Primary Examiner*—Michael R. Fleming
*Assistant Examiner*—Robert W. Downs
*Attorney, Agent, or Firm*—Barry N. Young; Penelope S. Wilson; Dirk Brinkman

[57] ABSTRACT

A rule invocation mechanism in an inductive learning engine employing symbolic rules for characterizing a sequence of time-related events. The rules to be tested as hypotheses against new events in the sequence are ranked according to their information content or "quality" value. The efficiency of the rule-to-event pattern matching process for characterizing the new events is increased by not testing a hypothesis if a much better hypothesis already exists. Those hypotheses that characterize events in the sequence are tagged to the event.

30 Claims, 3 Drawing Sheets

| HYPOTHESIS | EPISODE E: | $e_1$ | $e_2$ | $e_3$ | $e_4$ | $e_5$ | $e_6$ | $e_7$ | $e_8$ | EFFECTIVE EPISODE LENGTH |
|---|---|---|---|---|---|---|---|---|---|---|
| | | $e_1$ | $e_2$ | $e_3$ | $e_4$ | $e_5$ | $e_6$ | $e_7$ | $e_8$ | 8 |
| | | EVENTS TAGGED BY HYPOTHESIS | | | | | | | | |
| $h_1$ | | $h_1$ | $h_1$ | | | | | | | 5 |
| $h_2$ | | $h_1$ | $h_1$ | $h_2$ | | | | | | 3 |
| $h_3$ | | $h_1$ | $h_1$ | $h_2, h_3$ | $h_2$ | $h_2$ | | $h_1$ | $h_3$ | 2 |
| $h_4$ | | $h_1$ | $h_1$ | $h_2, h_3$ | $h_4$ | $h_2$ | | $h_1$ | $h_3$ | 1 |

RULE INVOCATION MECHANISM FOR INDUCTIVE LEARNING ENGINE

BACKGROUND OF THE INVENTION

The present invention relates to the field of computer-assisted information and knowledge processing known as "artificial intelligence," and more particularly to a symbolic rule invocation mechanism for an inductive learning engine applicable to domains that use time-based representations such as security auditing.

"Artificial intelligence" is directed to the development of processes and systems using digital computers to mimic the performance of human intelligent behavior. An important goal of artificial intelligence is to give computers the ability to learn from experience, which is one of the most prominent traits of intelligent behavior. This ability enables computers to learn complex concepts that may be difficult for humans to articulate and also to adapt to changing environments. Furthermore, the ability of a computer to learn relieves humans from the tedious task of spoon-feeding computers with the knowledge needed to perform particular functions.

Most current knowledge-based systems use "deductive" inference techniques to acquire knowledge. In these techniques, general principles (or rules in the case of rule-based systems) are acquired from experts and stored in a knowledge base. Knowledge acquired in this manner is generally heuristic, that is, it represents facts and empirical associations, or patterns, that experts in the particular domain have developed through their own experience.

Deductive knowledge-based systems are necessarily limited by the quantity, variety, and accuracy of the knowledge they contain. Thus, a deductive knowledge-based system typically can be used only in connection with circumstances within the domain of the knowledge that system contains. If the system encounters circumstances which are unexpected and outside of that domain, the system will not be able to provide assistance. Furthermore, heuristic knowledge of this type is often of limited utility because it is difficult to verify and update.

Therefore, it is desirable for computers to acquire knowledge directly rather than, or in addition to, acquiring knowledge from experts. One way to acquire knowledge directly is to use "inductive" inference techniques to infer knowledge in a particular domain from examples in the domain. An inductive learning system generates generalized descriptions or patterns (or rules in the case of rule-based systems) from the information provided as domain examples. The examples may be data collected from actual operation in the domain, or from simulation models.

A specific problem in knowledge acquisition is the incremental acquisition of time-based symbolic patterns (or rules) from observations of time-based processes. Observations of time-based processes may take the form of "events" which depict the state of the process at a particular moment in terms of a set of attributes. An "episode" consists of a sequence of events occurring in time.

The goal of inductive learning as applied to time-based processes is to discover patterns (represented in the form of symbolic rules) which can be used to characterize processes or for prediction of subsequent events. Thus, each rule may describe a sequential pattern that predicts the next possible events with reasonable accuracy.

An example of a simplified rule characterizing a sequential pattern is as follows:

$$e_1 - e_2 - e_3 \rightarrow (e_4 = 95\%; e_5 = 5\%)$$

This rule indicates that if event $e_1$ is followed by event $e_2$, and event $e_2$ is followed by event $e_3$, then there is a 95% chance based on the previous observations that event $e_4$ will follow, and a 5% chance that event $e_5$ will follow.

the following is a simplified example which demonstrates the process of generating a set of hypotheses (i.e., patterns represented in the form of symbolic rules) from a sequence of events. Assuming that rules are to be discovered from the following episode where each letter represents an event in the episode:

$$A B C S T S T A B C A B C$$

the following hypotheses may be generated:

$h_1: A - B \rightarrow (C = 100\%)$ $H_2: C \rightarrow (S = 50\%; A = 50\%)$ $h_3: S \rightarrow (T = 100\%)$ $h_4: T \rightarrow (A = 50\%; S = 50\%)$ The hypotheses $h_1$, $h_2$, $h_3$, and $h_4$ may be viewed as alternative explanations that uncover what is happening in the process.

In incremental inductive learning, the rules are maintained and modified dynamically as new events occur. The capability to learn incrementally is important because it makes use of the knowledge acquired from previous events. Otherwise, the learning process is very inefficient because it must learn a concept from scratch each time a new event or episode occurs.

Hypotheses should be generated or modified so that eventually only high quality rules are left in the rule base. A high quality rule or hypothesis has, among others, the following properties: (1) high level of confidence, and (2) high accuracy in prediction.

A high level of confidence is achieved by rules that cover as many data points as possible. Thus, the more times a rule is tested against new data points or events in the sequence and is proved to be valid, the higher the confidence level. Such rules represent patterns that are highly repetitive.

Accuracy in prediction is expressed in the form of "entropy," which measures the degree of randomness in the prediction when a rule is matched against known data points. The entropy of a rul is defined as follows:

$$\sum_{i=1}^{n} (-p_i \log (p_i))$$

where $P_i$ is the probability that event i will occur under the conditions specified in the rule.

FIG. 1 shows how a "good" pattern in terms of quality is found by minimizing the entropy value and maximizing the coverage. The "good" pattern covers or explains one type of data point represented by a "−" and therefore has a very low entropy. It also has maximum coverage because it explains all of the "−" data points. The "bad" pattern, on the other hand, has a higher degree of randomness in its prediction and therefore a high entropy. Since it covers nearly equal numbers of "−" and "+" data points, its usefulness in prediction is limited.

By definition, a rule with a skewed probability distribution in its right hand side (i.e., its set of possible outcomes) has a low entropy. Thus, rule $r_1$ in the following example, with a skewed probability distribution, has a much lower entropy than rule $r_2$:

$r_1: e_4 - e_2 \rightarrow (e_3=95\%; e_4=2\%; e_5=3\%)$ $r_2: e_6=e_7 \rightarrow (e_8=30\%; e_9=30\%; e_{10}=40\%)$ Theoretically, the lowering of entropy amounts to the gaining of information, because from a set of possible outcomes having a low entropy, one can learn that one outcome is more likely. Thus, the whole process of incremental inductive learning can be viewed as an attempt to extract as much information as possible from the seemingly random data.

FIG. 2 is a simplified block diagram of a system for incremental inductive learning. Newly occurring events are input to an inductive learning engine 10. The inductive learning engine is embodied in a computer program operating on a digital computer. The rule base 12 contains symbolic rules of the form such as in the examples above and is stored in the memory of the digital computer. The inductive leaning engine maintains and dynamically modifies the rules in the rule base in response to the new events.

The inductive learning engine may also use certain background knowledge 14 applicable to the particular domain to evaluate and modify the rules in the rule base. The background knowledge may contain, for example, constructive induction rules that generate new attributes not present in the initial data. Background knowledge may also include models of the domain, which may aid the inductive learning engine in generating plausible hypotheses.

As inductive learning engine of the type shown in FIG. 2 is described in K. Chen, "An Inductive Engine for the Acquisition of Temporal Knowledge," Doctoral Thesis, Department of Computer Science, University of Illinois (1988), which is hereby incorporated by reference.

One of the functions performed by the inductive learning engine is determining which rules in the rule base 12 are affected by the new events and also have the greatest possibility of being further improved by the new events. This is known as "rule invocation."

Previously, it has been proposed to invoke all of the rules in the rule base to determine which rules best characterize the sequence of events including the new events. For a large rule base, however, exhaustive rule invocation is impractical, especially for real-time applications. Rule invocation involves pattern-matching between rules and events which is an expensive process in terms of computer resources.

Alternatively, a subset of the rules in the rule base may be invoked based on predetermined criteria, such as, for example, selecting only a certain number of the "best" rules in terms of quality. Even this technique has disadvantages, however, because the expensive rule-to-event pattern-matching must still be performed for all of the rules in the subset. In order to maintain the quality of the rule base, the number of rules in the subset must generally be sufficiently large that real-time processing is still difficult or impossible.

SUMMARY OF THE INVENTION

Accordingly, it is a goal of this invention to improve the rule invocation mechanism in an inductive learning engine through minimization of the expensive rule-to-event pattern matching process while preserving the quality of the rules.

This goal is achieved by first ranking the rules to be tested as hypotheses according to their information content or "quality" value. The efficiency of the rule-to-event pattern matching process for characterizing the new events is then increased by ignoring those hypotheses where much better hypotheses already exist. Thus, hypotheses that are not competitive with other hypotheses in characterizing the same sequence of events are prevented from entering the expensive pattern matching process. Hypotheses with similar quality values are retained, however, awaiting disambiguation by further results. Likewise, ignored hypotheses may enter the pattern-matching process in other parts of the episode. This decreases the possibility of missing those hypotheses that may eventually turn out to be good.

More specifically, the method of invoking rules in accordance with the present invention, as broadly described and embodied herein, is embodied in a rule-based computer system employing rules for characterizing a sequence of time-related events, each rule having an associated quality value. The method comprises the steps, executed by the computer system, of: selecting the rules in order of decreasing quality values, finding the ones of the rules which characterize the sequence of events and have a quality value that is not less by a predetermined amount than the quality value of any other of the rules which characterize the sequence, and tagging each of the events with the ones of the found rules for characterizing the sequence including that event.

In a preferred embodiment of the method, the finding step includes the substeps of determining whether an event in the sequence has been previously tagged with one of the rules, and testing whether a selected one of the rules characterizes the sequence including the event if the event was not previously tagged. The finding step may further include the substeps of of a rule tagged to the event is greater than the quality of a selected one of the rules by the predetermined amount, and testing whether the selected one of the rules characterizes the sequence including the event if the quality of the rule tagged to the event is not greater than the quality of the selected one of the rules by the predetermined amount.

Likewise, in accordance with the invention, a rule-based computer system, employing rules for characterizing a sequence of time-related events, each rule having an associated quality value, comprises: storage means for storing a set of rules for characterizing the sequence of events, and rule invocation means, coupled to the storage means, for determining which rules in the set best characterize the sequence of events. The rule invocation means comprises: ranking means for ranking the rules in the set according to decreasing quality value, pattern-matching means, coupled to the ranking means, for determining in ranked order whether a next rule in the set characterize the sequence of events, tagging means, coupled to the pattern-matching means, for tagging each of the events with those rules which are determined by the pattern-matching means to characterize the sequence of events including that event, and comparator means, coupled to the ranking means and the pattern-matching means, for comparing the quality value of a lower ranked rule with the quality value of a higher-ranked rule tagged to an event and for selecting the lower-ranked rule as the next rule for input to the pattern-matching means if the quality of the higher-ranked rule is not greater than the quality value of the lower ranked rule by a predetermined amount. In a preferred embodiment of the invention, the system further includes rule generating means, coupled to the storage means and responsive to the rule invocation means, for generating a new rule to characterize the sequence of events.

In addition, the invention may be embodied in a computer program product having a computer readable medium having computer program logic recorded thereon.

The method and system according to the invention provide increased efficiency in an inductive learning engine by using the quality of rules to determine which rules best characterize the sequence of events. By using this information to reduce the rule-to-event pattern matching process, the performance of the inductive learning engine may be increased significantly without significant degradation in the convergence toward a set of quality rules. Such degradation is prevented by the retention of those lower quality rules which may still turn out to be high quality rules with more new events.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

DESCRIPTION OF THE PREFERRED EMBODIMENT

Reference will now be made in detail to the presently preferred embodiment of the invention, an example of which is illustrated in the accompanying drawings.

Figure 1:
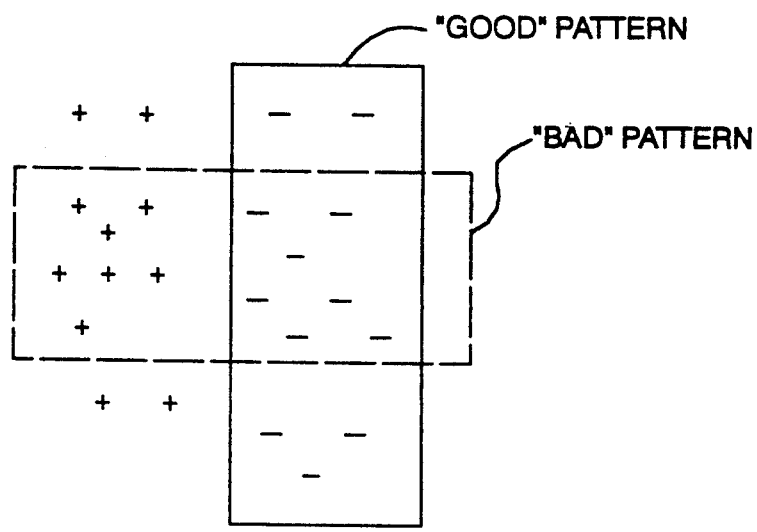
FIG. 1 is diagram illustrating the difference between "good" and "bad" patterns in terms of "quality"
Figure 2:
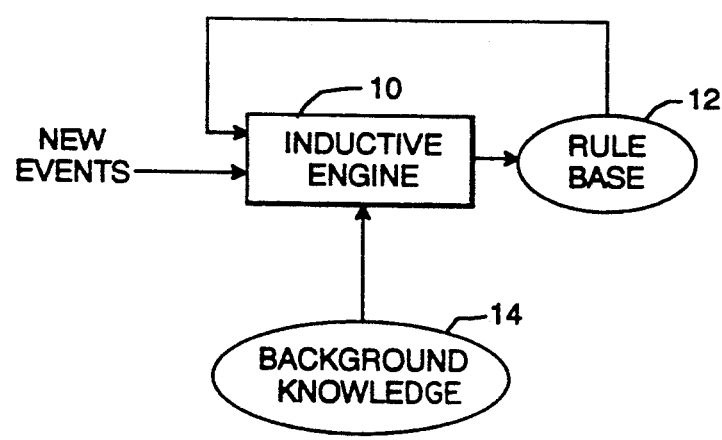
FIG. 2 is a schematic block diagram of a system for incremental inductive learning.
Figures 3, 4:
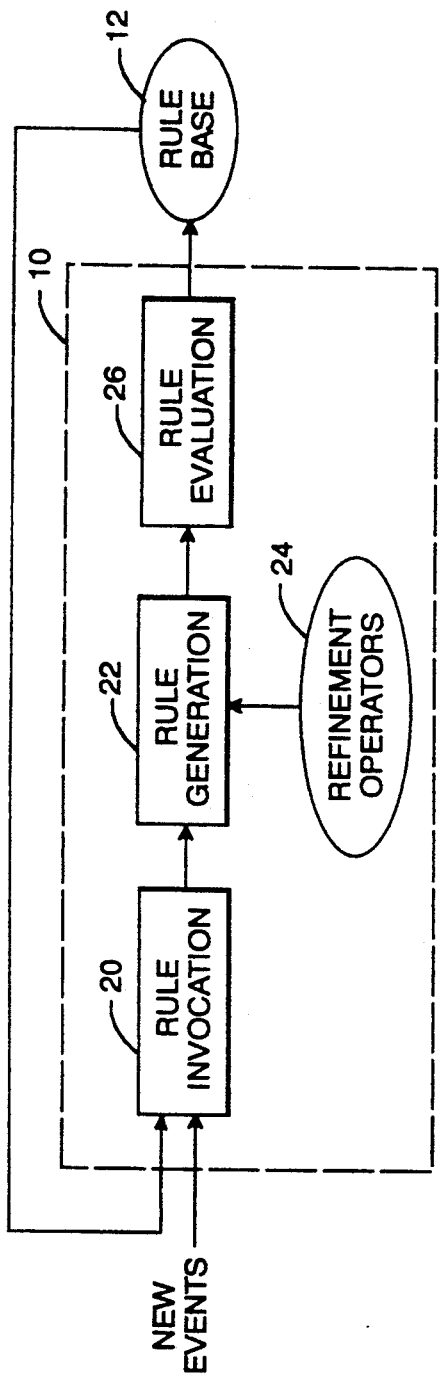
FIG. 3 is a schematic block diagram of an inductive learning engine.
FIG. 4 is an example of sequence reduction of an episode according to the invention.

FIG. 3 is a schematic block diagram showing the functional elements of the inductive learning engine 10 of FIG. 2. The inductive learning engine includes three basic parts: a rule invocation portion 20; a rule generation portion 22; and a rule evaluation portion 24.

The rule invocation portion 20 receives as inputs the new events and the rules in the rule base 12. The rule invocation portion determines which rules in the rule base 12 best characterize the sequence of events including the new events and also have the greatest possibility of being further improved by the new events, in the manner described in detail below.

In the rule generation portion 22, the invoked rules (or hypotheses) from the rule invocation portion 20 are modified using a set of refinement operators 24 until satisfactory rules are found to cover the new events. In its simplest terms, rule refinement means modifying a hypothesis by (1) making the hypothesis more general whenever it is overspecialized (e.g., when the hypothesis does not cover certain positive examples), and (2) making the rule more specialized whenever it is overgeneralized (e.g., the hypothesis covers negative examples).

The rule evaluation portion 26 evaluates the modified hypotheses from the rule generation portion 22 in order to decide whether the new hypotheses satisfy certain predefined criteria. These criteria may include the quality of the rule based on its entropy and confidence level as well as the syntactical complexity of the rule. Simpler rules, such as, for example, rules having fewer conditions in the left-hand side to explain the same event in the right-hand side, are preferable over more complex rules. Hypotheses that satisfy these criteria are returned to the rule base 12.

Rule invocation portion 20 requires pattern matching between rules and events to determine which rules best characterize the sequence of events including the new events. This process entails matching the conditions in the left- and right-hand sides of a rule with the events in the sequence to determine whether the rule "covers" the sequence including the new events. If the conditions of the left-hand side of the rule are satisfied by the prior sequence of events, as determined by the pattern matching process, then the new events may be classified as positive or negative instances of the rule, depending on whether the right-hand side of the rule is also satisfied. If the events in the sequence only partially satisfy the conditions of the left-hand side of rule, but still match the right-hand side, then the rule may justify further refinement. Otherwise, the sequence of events may not match the rule at all and is therefore irrelevant to the rule.

In order to increase the processing speed of the inductive learning engine, the rule invocation portion according to the present invention reduces or eliminates the expensive rule-to-event pattern matching process by: (1) ranking the hypotheses obtained from the rule base according to decreasing quality values; (2) tagging events with hypotheses that cover the event; and (3) reducing the effective length of an episode by preventing the expensive rule-to-event pattern matching process if an event in the episode was covered by a substantially better hypothesis.

More specifically, the rules from the rule base 12 which are used as hypotheses for characterizing the sequence including the new events are ranked so that the best hypotheses are considered first according to decreasing quality values. The quality value of a rule or hypothesis is determined at least in part by its accuracy of prediction, which may be expressed as entropy, and a confidence level which indicates the rule's past effectiveness at characterizing the sequence of events.

Hypotheses may also be ranked based on other criteria such as syntactical complexity, generality, and significance. In terms of complexity, all other factors being equal, simpler rules are preferred to more complex rules. As for generality, more general rules have greater explaining power and are thus preferred over more specialized rules. Also certain types of rules which characterize or predict important events may be assigned a level of significance.

All of these criteria may be weighted and combined in a function "Q" of a given hypothesis. The particular weight and combination will depend on the domain in which the system is used and the goals the system is designed to achieve. The function "Q" will generally include at least some combination of the entropy and confidence level of the hypothesis.

In processing a new episode consisting of a sequence of events, the rule invocation portion according to the invention tags events in the sequence with those hypotheses which have been determined through the rule-to-event pattern matching to cover the event. If an event is tagged by at least one hypothesis, and thus is covered by that hypothesis, subsequent hypotheses which are substantially lower in quality will be eliminated from the expensive pattern matching process.

The mechanism for using these tags to reduce the effective length of an episode, while eliminating from consideration those hypothesis which are substantially lower in quality, is called "sequence reduction." FIG. 4 is simplified example showing the reduction of an episode over several hypotheses. The episode E consists of eight events $e_1$, $e_2$, $e_3$, $e_4$, $e_5$, $e_6$, $e_7$, and $e_8$. The hypotheses $h_1$, $h_2$, $h_3$, and $h_4$, are ranked as follows:

$$Q(h_1) >> Q(h_2) > Q(h_3) >> Q(h_4)$$

where $Q(h_i)$ represents the quality of hypothesis $h_i$. Thus, rule-to-event pattern matching occurs in the order $h_1$, $h_2$, $h_3$, and $h_4$.

As shown in FIG. 4, the first hypothesis $h_1$ covers three events out of the eight events in the episode. Thus, events $e_1$, $e_2$, and $e_7$, are tagged with hypothesis $h_1$. Testing determines that $Q(h_1)$ is substantially greater than $Q(h_2)$, so that the events $e_1$, $e_2$, and $e_7$, are effectively removed from the episode and the effective length of the episode is only five. The remaining hypotheses $h_3$ and $h_4$, having substantially lower quality, are also eliminated from consideration with respect to events $e_1$, $e_2$, and $e_7$, because they are inferior to $h_1$ based on the hypothesis quality test, and do not enter into the expensive rule-to-event pattern matching process.

Hypothesis $h_2$ also covers two events $e_3$ and $e_4$, reducing the effective episode length to three. In this example, assuming that $Q(h_2)$ is not substantially greater than $Q(h_3)$, then hypothesis $h_3$ will enter into pattern matching for the same events, $e_3$, $e_4$, $e_5$, $e_6$, and $e_8$. If hypothesis $h_3$ covers $e_3$ as shown in FIG. 4, then $e_3$ will also be tagged with $h_3$ as well as $h_2$. Also as shown, $e_8$ is tagged with $h_3$ reducing the effective episode length to two. Hypothesis $h_4$, which is significantly inferior to $h_3$ based on the hypothesis quality test, covers only one of the remaining events $e_4$, leaving event $e_6$ unexplained by the four existing hypotheses.

The invoked hypotheses, i.e., those hypotheses that are determined to characterize the sequence of events including the new events or are the best in terms of quality for those events that are unexplained by the existing hypotheses, are input to the rule generation portion 22 of the inductive learning engine 10. Depending on the inductive learning strategy employed, the invoked rules may be modified using the set of refinement operators 24 until satisfactory rules are found to cover the new events.

Figure 5:
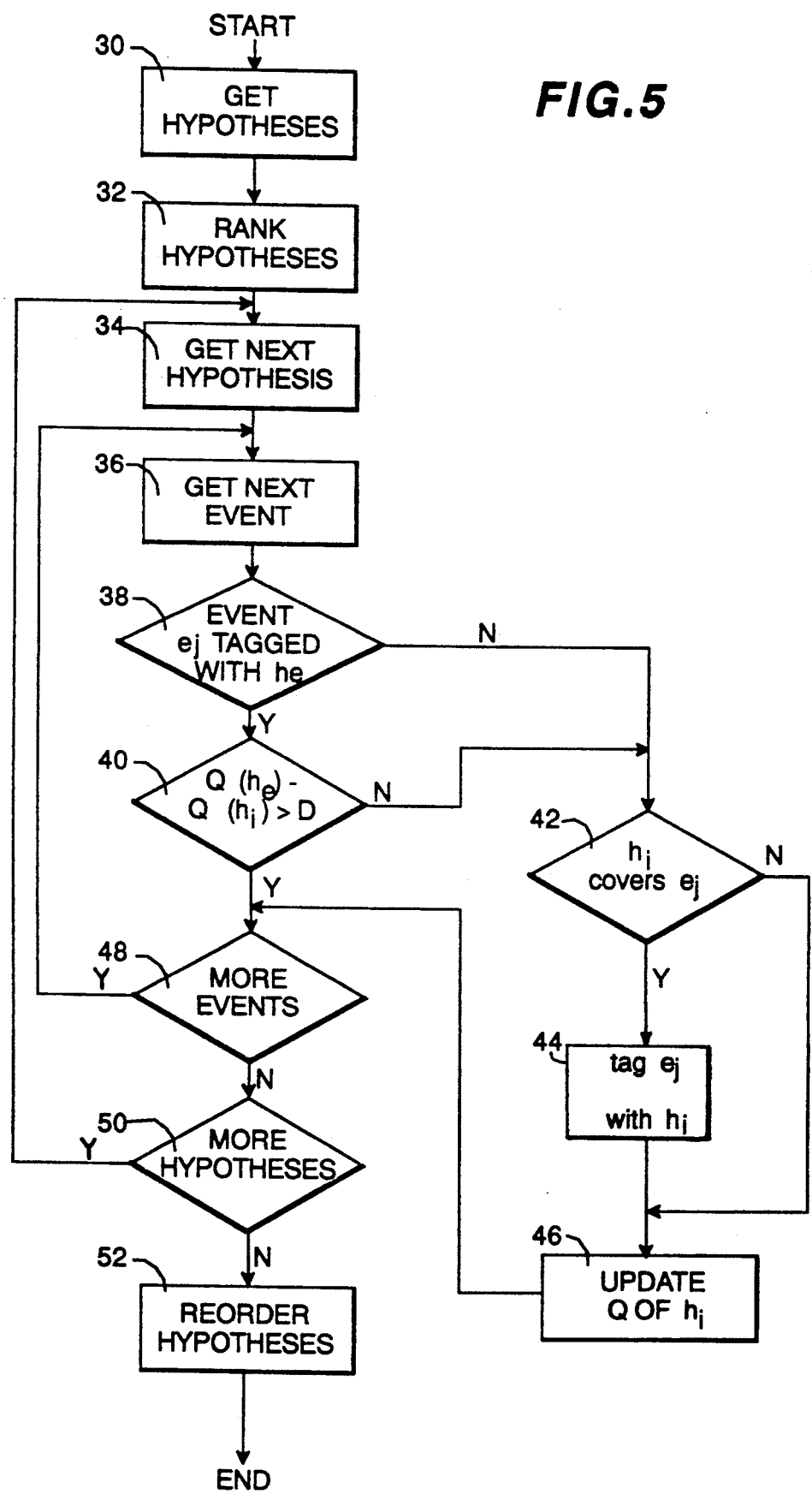
FIG. 5 is a flow diagram of the steps performed in the rule invocation method according to the invention.

FIG. 5 is a flow chart showing the sequence of operation of the rule invocation portion of the inductive learning engine according to one embodiment of the invention. In the first step 30, the rule invocation portion obtains from the rule base those rules which will form the hypotheses to be tested for explaining the new events in the episode. The selected rules may consist of all of the rules in the rule base or a subset of the rules based in part on some measure of quality or other criteria.

In step 32, the rule invocation portion ranks the selected hypotheses according to a predetermined function Q which is based at least in part on the quality of the hypotheses. The rule-to-event pattern matching in subsequent steps will take place in the order of the ranked hypotheses with the higher ranked hypotheses being processed first.

Step 34 is the first step in a first control loop in which the next hypothesis $h_i$ is obtained from the selected hypotheses according to its ranking as determined in step 32. Each hypothesis is preferably processed one at a time with respect to all of the events of a given episode. Likewise, step 36 is the first step of a second control loop in which the next event $e_j$ in the sequence is obtained from the episode.

In steps 38 and 40, the rule invocation portion determines whether the current hypothesis $h_i$ and the current event $e_j$ will be input to the rule-to-event matching process. This is accomplished by first determining in step 38 whether the event $e_j$ is already tagged with another hypothesis $h_e$ indicating that the hypothesis covers that event. If not, then the hypothesis $h_i$ and event $e_j$ are input to the pattern matcher in step 42 to determine whether $h_i$ covers $e_j$.

If event $e_j$ is tagged by another hypothesis $h_e$, however, then the Q function of the two hypotheses $h_e$ and $h_i$ are compared in step 40. If $Q(h_e)$ is substantially greater than $Q(h_i)$, that is, if $Q(h_e)$ is greater than $Q(h_i)$ by a predetermined difference D, then hypothesis $h_i$ is eliminated from further consideration with respect to event $e_j$. Otherwise, hypothesis $h_i$ and event $e_j$ are input to the pattern matcher in step 42.

In step 42, the pattern matcher determines whether current hypothesis $h_i$ covers current event $e_j$. If so, then event $e_j$ is tagged with hypothesis $h_i$ in step 44 to indicate that event $e_j$ is covered by hypothesis $h_i$. Then, in step 46, whether the rule-to-event pattern match in step 42 was successful or not, the Q function of the current hypothesis $h_i$ is updated for use in comparison with other hypotheses. For example, both the in prediction of the hypotheses, as measured by entropy, and the confidence level, as measured by the number of times the hypothesis has previously been invoked, will change as a result of the pattern matching process.

If there are no more events in the episode for processing in relation to the current hypothesis $h_i$, then in step 48, the second control loop is exited. Otherwise, program control returns to step 36 to obtain the next event in the episode and to continue processing.

Likewise, if there are no more hypotheses from the selected group from the rule base to test, then in step 50, the first control loop is exited and the reduction of the new episode is complete. Otherwise, program control returns to step 34 to obtain the next hypothesis and the continue processing the episode in relation to the next hypothesis.

Finally, in step 52, the hypotheses are reordered according to the Q function for input to the rule generation portion 22 of the inductive learning engine 10.

The rule invocation mechanism according to the present invention is applicable to any system of incremental inductive learning used for discovering sequential patterns from large amounts of data. As such, the invention may be applied in such areas as order transaction processing, manufacturing quality control, network diagnosis, adaptive user interfaces, bank account transaction auditing, or other domains where discovery of trends or patterns is important.

One specific area in which the use of the invention is presently contemplated is in the area of computer security. The inductive learning engine may be used, for example, to generate rules representing user profiles describing the sequence of activities of various users of the computer system. These user profiles can then be used to detect unauthorized entry into the system or abusive activities by legitimate users.

For example, within the context of computer security, an event could be a security record in the system audit trail or a shell command, including corresponding co and parameters and qualifiers, as normally entered and interpreted by the command interpreter of the computer's operating systems. Assuming that sequential patterns exist in the audit trail or command sequence of a computer user, then the inductive learning engine can be used to incrementally generate rules representing user profiles. Such rules can then be used to detect unusual activities that deviate from a user's established behavioral profile or to uncover activities that are unrecognized in the user's established profile. These rules can also provide a simplified view of the security audit trail where repetitive sequences of events are compressed into a few rules.

The rule invocation mechanism of the present invention, by substantially increasing the efficiency of the inductive learning engine, makes it possible to generate rules for computer security in real time without significant degradation of the quality of the rules. By using the quality of the rules to guide rule invocation, the rule-to-event pattern matching process can be substantially eliminated by ignoring those hypotheses where much better explanations already exist.

It will be apparent to those skilled in the art that various modifications and variations can be made in the rule invocation mechanism for the inductive learning engine without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. In a rule-based computer system empoloying rules for characterizing a sequence of time-related events, each rule having a set of conditions and an associated quality value, a method of invoking the rules, comprising the steps, executed by the computer system of:

selecting the rules in order of decreasing quality values;

selecting the rules in order of decreasing quality values;

finding in the selected order the ones of the rules which characterize the sequence of events by matching the conditions of the rules with the events and have a quality value that is not less by a predetermined amount than he quality of any other of the previously found ones of the rules which characterize the sequence of events;

tagging each of the events with the found ones of the rules which characterize the sequence including that event;

determining whether an event in the sequence has been previously tagged with one of the rules;

testing whether a selected one of the rules characterizes the sequence including the event if the event was not previously tagged;

determining whether, for an event previously tagged, the quality of a rule tagged to the event is greater than the quality of a selected one of the rules by the predetermined amount;

testing whether the selected one of the rules characterizes the sequence including the event if the quality of the rule tagged to the event is not greater than the quality of the selected one of the rules by the predetermined amount; and updating the quality values of selected ones of the rules which are tested.

2. The method of claim 1 further comprising the step of reordering the rules according to decreasing quality value after testing.

3. The method of claim 1 further comprising the step of generating a new rule for characterizing the sequence of events.

4. The method of claim 3 further comprising the step of evaluating the new rule according to predetermined criteria including quality value.

5. In a rule-based computer system employing rules for characterizing a sequence of time-related events, each rule having a set of conditions and an associated quality value, a method of invoking the rules, comprising the steps, executed by the computer system of:

ranking the rules according to decreasing quality value;

selecting the rules in ranked order;

selecting one of the events in the sequence of events;

determining whether selected ones of the rules characterize the sequence of events, including the selected one of the events, by matching the conditions of the selected ones of the rules with the events, for each of the rules that have a quality value that is not less by a predetermined amount than the quality value of any other of the rules which were previously determined to characterize the sequence of events, including the selected one of the events;

tagging the selected on of the events with each of the selected ones of the rules which are determined to characterize sequence of the events including the selected one of the events;

determining whether the selected one of the events has been previously tagged with one of the rules;

testing whether the selected one of the rules characterizes the sequence including the selected one of the events if the selected one of the events was not previously tagged;

determining whether the quality of a rule tagged to the selected one of the events is greater than the quality of the selected one of the rules by the predetermined amount;

testing whether the selected one of the rules characterizes the sequence including the selected one of the events if the quality of the rule tagged to the selected one of the events is not greater than the quality of the selected one of the rules by the predetermined amount; and updating the quality values of selected ones of the rules which are tested.

6. The method of claim 5 further comprising the step of reordering the rules according to decreasing quality value after testing.

7. The method of claim 6 further comprising the step of reordering the selected rules according to decreasing quality value.

8. The method of claim 5 further comprising the step of generating a new rule for characterizing the sequence of events.

9. The method of claim 8 further comprising the step of evaluating the new rule according to predetermined criteria including quality value.

10. In a rule-based computer system employing rules for characterizing a sequence of time-related events, each rule having a set of conditions and an associated quality value, a method of incremental inductive learning, comprising the steps, executed by the computer system, of:

selecting a set of rules from a rule base in order of decreasing quality values;

finding in the selected order the ones of the rules which characterize the sequence of events by matching the conditions of the rules with the events and have a quality value that is not less by a predetermined amount than the quality value of any other of the previously found ones of the rules which characterize the sequence of events;

tagging each of the events with the found ones of the rules which characterize the sequence including that event;

generating a new rule for characterizing the sequence of events; and storing the new rule in the rule base.

11. The method of claim 10 wherein the finding step further includes the substeps of determining whether an event in the sequence has been previously tagged with one of the rules, and testing whether the selected one of the rules characterizes the sequence including the event if the event was not previously tagged.

12. The method of claim 11 wherein the fining step further includes the substeps of determining whether, for an event previously tagged, the quality of a rule tagged to the event is greater than the quality of a selected one of the rules by the predetermined amount, testing whether the selected one of the rules characterizes the sequence including the event if the quality of the quality of the rule tagged to the event is not greater than the quality of the selected one of the rules by the predetermined amount.

13. The method of claim 12 further comprising the step of updating the quality values of selected ones of the rules which are tested.

14. The method of claim 13 further comprising the step of reordering the rules according to decreasing quality value after testing.

15. The method of claim 10 further comprising the step of evaluating the new rule according to predetermined criteria including quality value.

16. The method of claim 10 wherein each rule has an associated entropy value which measures accuracy of prediction of the rule, and the quality value associated with each rule is based in part on the entropy value of that rule.

17. The method of claim 10 wherein each rule has an associated confidence level which indicates past effectiveness of the rule, and the quality value associated with each rule is based in part on the confidence level of that rule.

18. The method of claim 10 wherein each rule has a syntactical complexity, and the quality value associated with each rule is based in part on the syntactical complexity of that rule.

19. In a rule-based computer system employing rules for characterizing a sequence of time-related events, each rule having a set of conditions and an associated quality value, a method of incremental inductive learning, comprising the steps, executed by the computer system, of:

selecting a set of rules from a rule base in order of decreasing quality values;

selecting one of the events in the sequence of events;

determining whether selected ones of the rules characterize the sequence of events, including the selected one of the events, by matching the conditions of the selected ones of the rules with the events, for each of the rules that have a quality value that is not less by a predetermined amount than the quality value of any other of the rules which were previously determined to characterize the sequence of events, including the selected ones of the events;

tagging the selected one of the events with each of the selected ones of the rules which are determined to characterize the sequence of events including the selected one of the events;

generating a new rule for characterizing the sequence of events; and storing the new rule in the rule base.

20. The method of claim 19 wherein the determining step includes the substeps of determining whether the selected one of the events has been previously tagged with one of the rules, and testing whether the selected one of the rules characterizes the sequence including the selected one of the events if the selected one of the events was not previously tagged.

21. The method of claim 20 wherein the determining step further includes the substeps of determining whether the quality of a rule tagged to the selected one of the events is greater than the quality of the selected one of the rules by the predetermined amount, and testing whether the selected one of the rules characterizes the sequence including the selected one of the events if the quality of the rule tagged to the selected one of the events is not greater than the quality of the selected one of the rules by the predetermined amount.

22. The method of claim 21 further comprising the step of updating the quality values of selected ones of the rules which are tested.

23. The method of claim 22 further comprising the step of reordering the rules according to decreasing quality value after testing.

24. The method of claim 19 further comprising the step of evaluating the new rule according to predetermined criteria including quality value.

25. The method of claim 19 wherein each rule has an associated entropy value which measures accuracy of prediction of the rule, and the quality value associated with each rule is based in part on the entropy value of that rule.

26. The method of claim 19 wherein each rule has an associated confidence level which indicates past effectiveness of the rule, and the quality value associated with each rule is based in part on the confidence level of that rule.

27. The method of claim 19 wherein each rule has a syntactical complexity, and the quality value associated with each rule is based in part on the syntactical complexity of that rule.

28. A rule-based computer system employing rules for characterizing a sequence of time-related events, each rule having a set of conditions and an associated quality value, the system comprising:

storage means for storing a set of symbolic rules for characterizing the sequence of events;

rule invocation means, coupled to the storage means, for determining which rules in the set best characterize the sequence of events, the rule invocation means comprising:

ranking means for ranking the rules in the set according to decreasing quality value;

pattern-matching means, coupled to the ranking means, for determining in ranked order whether a next rule in the set characterizes the sequence of events by matching the conditions of the next rule with the events;

tagging means, coupled to the pattern-matching means, for tagging each of the events with those rules which are determined by the pattern-matching means to characterize the sequence of events including the event;

comparator means, coupled to the ranking means and the pattern-matching means, for comparing the quality value of a lower ranked rule with the quality value of a higher-ranked rule tagged to an event and for selecting the lower-ranked rule as the next rule for input to the pattern-matching means if the quality of the higher-ranked rule is not greater than the quality value of the lower ranked rule by a predetermined amount;

rule generating means, coupled to the storage means and responsive to the rule invocation means, for generating a new rule to characterize the sequence of events.

29. The system of claim 28 further comprising evaluating means, coupled to the storage means and the rule generating means, for evaluating the new rule generated by the rule generating means according to predetermined criteria including quality value.

30. The system of claim 29 wherein the rule invocation means further comprises means, coupled to the pattern-matching means, for updating the quality value of the next rule input to the pattern matching means according to the determination by the pattern-matching means whether the next rule characterizes the sequence of events including the next event.

* * * * *